United States Patent
Verma et al.

(10) Patent No.: US 11,057,880 B2
(45) Date of Patent: Jul. 6, 2021

(54) WIRELESS COMMUNICATION WITH PER-STATION PUNCTURED TRANSMISSIONS

(71) Applicant: QUALCOMM Incorporated, San Diego, CA (US)

(72) Inventors: Lochan Verma, San Diego, CA (US); Bin Tian, San Diego, CA (US); Youhan Kim, Saratoga, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/421,258

(22) Filed: May 23, 2019

(65) Prior Publication Data

US 2019/0380117 A1      Dec. 12, 2019

Related U.S. Application Data

(60) Provisional application No. 62/683,616, filed on Jun. 11, 2018.

(51) Int. Cl.
*H04W 4/00* (2018.01)
*H04W 72/04* (2009.01)
(Continued)

(52) U.S. Cl.
CPC ........ *H04W 72/044* (2013.01); *H04B 7/0413* (2013.01); *H04L 5/0007* (2013.01);
(Continued)

(58) Field of Classification Search
None
See application file for complete search history.

(56) References Cited

U.S. PATENT DOCUMENTS

2016/0019876 A1* 1/2016 Jeffrey ............... H04N 21/4394
                                                     700/94
2017/0041171 A1* 2/2017 Li ........................ H04L 5/0053
(Continued)

FOREIGN PATENT DOCUMENTS

EP       3396925       10/2018
WO    2017111567      6/2017

OTHER PUBLICATIONS

IEEE, "IEEE P802.11ax™/D3.0", Draft Standard for Information technology—Telecommunications and information exchange between systems Local and metropolitan area networks—Specific requirements, 2018, 682 pages.
(Continued)

*Primary Examiner* — Phirin Sam
(74) *Attorney, Agent, or Firm* — Kevin T. Cheatham

(57) ABSTRACT

This disclosure provides systems, methods, and apparatus, including computer programs encoded on computer-readable media, for per-station punctured transmissions. A wireless local area network (WLAN) device may determine available resource units (RUs) within a wireless channel that has a punctured frequency range. The WLAN device may allocate a plurality of RUs, from among the available RUs, for to include data for a same station. For example, a physical layer protocol data unit (PPDU) may include more than one RU for a first station. The RUs that are allocated to the first station may exclude the punctured frequency range. In some implementations, the plurality of RUs may be separated by at least the punctured frequency range. A signaling header in the PPDU may indicate which RUs are allocated to the first station. By allocating a plurality of RUs in a PPDU, a WLAN may support per-station puncturing within the PPDU.

25 Claims, 9 Drawing Sheets

(51) Int. Cl.
*H04B 7/0413* (2017.01)
*H04L 29/06* (2006.01)
*H04L 5/00* (2006.01)
*H04W 88/08* (2009.01)
*H04W 84/12* (2009.01)

(52) U.S. Cl.
CPC ............ *H04L 69/22* (2013.01); *H04W 84/12* (2013.01); *H04W 88/08* (2013.01)

(56) References Cited

U.S. PATENT DOCUMENTS

| | | | |
|---|---|---|---|
| 2017/0181129 A1 | 6/2017 | Bharadwaj et al. | |
| 2017/0273083 A1 | 9/2017 | Chen et al. | |
| 2017/0302422 A1* | 10/2017 | Chu | H04L 5/0053 |
| 2017/0311292 A1* | 10/2017 | Choi | H04L 5/0053 |
| 2018/0020367 A1* | 1/2018 | Hsu | H04W 48/10 |
| 2019/0044674 A1* | 2/2019 | Li | H04L 5/0051 |
| 2019/0215037 A1* | 7/2019 | Seok | H04L 5/0044 |
| 2019/0260531 A1* | 8/2019 | Chen | H04W 72/0453 |
| 2019/0334590 A1* | 10/2019 | Son | H04L 5/0048 |
| 2020/0137736 A1* | 4/2020 | Du | H04W 72/1242 |
| 2020/0267653 A1* | 8/2020 | Son | H04L 5/0041 |

OTHER PUBLICATIONS

"PCT Application No. PCT/US2019/034468 International Search Report and Written Opinion", dated Aug. 19, 2019, 14 pages.

* cited by examiner

WIRELESS COMMUNICATION WITH PER-STATION PUNCTURED TRANSMISSIONS

CROSS-REFERENCE TO RELATED APPLICATIONS

This Patent Application claims priority to U.S. Provisional Patent Application No. 62/683,616, filed Jun. 11, 2018, entitled "WIRELESS COMMUNICATION WITH PER-STATION PUNCTURED TRANSMISSIONS," and assigned to the assignee hereof. The disclosure of the prior Application is considered part of and is incorporated by reference in this Patent Application.

TECHNICAL FIELD

This disclosure relates generally to the field of network communication, and more particularly to wireless communication.

DESCRIPTION OF THE RELATED TECHNOLOGY

An access point (AP) of a wireless local area network (WLAN) can enable wireless network access for a station (STA). The AP may provide a wireless coverage area used by one or more STAs to access the WLAN via the AP. The wireless coverage area provided by an AP may utilize a portion of a frequency band (such as a 2.4 GHz frequency band, a 5 GHz frequency band, a 6 GHz frequency band, a 60 GHz frequency band, etc.). Within each frequency band, there may be different channels which an AP may utilize for the coverage area. Some WLAN devices can utilize groups of channels (as subchannels) to create a larger wireless channel having more overall bandwidth for WLAN communication.

New technologies are being developed which can utilize overlapping portions of a frequency band. For example, WLAN signals may occupy a frequency band that is also used by signals of an incumbent system (such as satellite, radar, terrestrial radio, or cellular signals). It is desirable to prevent or mitigate interference to an incumbent system caused by a WLAN utilizing an overlapping portion of a frequency band in a same geographical area. When an incumbent signal is present on a subchannel that is part of a wireless channel used by a WLAN device, the WLAN device may puncture that subchannel to avoid interference with the incumbent signal. Puncturing refers to the avoidance of part of an available bandwidth of a wireless channel. While puncturing is useful for minimizing interference with an incumbent signal, current approaches to puncturing may limit the allocation of resources within a wireless channel.

SUMMARY

The systems, methods, and devices of this disclosure each have several innovative aspects, no single one of which is solely responsible for the desirable attributes disclosed herein.

One innovative aspect of the subject matter described in this disclosure can be implemented by a wireless local area network (WLAN) device, such as an access point (AP). The WLAN device may determine available resource units (RUs) within a wireless channel, where the wireless channel includes at least one punctured frequency range. The WLAN device may allocate a plurality of RUs to a first station such that the plurality of RUs are punctured to exclude the at least one punctured frequency range. The WLAN device may prepare a physical layer protocol data unit (PPDU) for transmission via the wireless channel, the PPDU having data for the first station at the plurality of RUs allocated to the first station In some implementations, the WLAN device may transmit the PPDU to at least the first station.

In some implementations, the PPDU may include a multi-user (MU) multiple-input-multiple-output (MIMO) transmission.

In some implementations, the PPDU may include an orthogonal frequency divisional multiple access (OFDMA) transmission.

In some implementations, allocating the plurality of RUs to the first station may include allocating a first RU and a second RU that are not contiguous with each other.

In some implementations, the WLAN device may prepare a signaling header for the PPDU. The signaling header may indicate the plurality of RUs that are allocated to the first station.

In some implementations, preparing the signaling header may include redefining a meaning of at least one existing signaling header to support allocation of punctured RUs to the first station.

In some implementations, preparing the signaling header may include duplicating a user-specific field among the plurality of channels excluding the at least one punctured frequency range. The user-specific field may indicate the plurality of RUs allocated to the first station.

In some implementations, the PPDU may be a downlink transmission from an access point to the first station.

In some implementations, the WLAN device may allocate a second plurality of RUs in the PPDU to a second station. The WLAN device may include data for the second station at the second plurality of RUs within the PPDU.

Another innovative aspect of the subject matter described in this disclosure can be implemented as a computer-readable medium having stored therein instructions which, when executed by a process of a WLAN device causes the WLAN device to determine available RUs within a wireless channel, where the wireless channel includes at least one punctured frequency range. The instructions, when executed by the processor, may cause the WLAN device to allocate a plurality of RUs to a first station such that the plurality of RUs exclude the at least one punctured frequency range. The instructions, when executed by the processor, may cause the WLAN device to prepare a PPDU for transmission via the wireless channel. The PPDU may have data for the first station at the plurality of RUs allocated to the first station.

In some implementations, the instructions to allocate the plurality of RUs may include instructions which, when executed by the processor, cause the WLAN device to allocate a first RU and a second RU that are not contiguous with each other.

In some implementations, the instructions, when executed by the processor, may cause the WLAN device to prepare a signaling header for the PPDU. The signaling header may indicate the plurality of RUs that are allocated to the first station.

In some implementations, the instructions to prepare the signaling header may include instructions which, when executed by the processor, cause the WLAN device to redefine a meaning of at least one existing signaling header to support allocation of punctured RUs to the first station.

In some implementations, the instructions to prepare the signaling header may include instructions which, when executed by the processor, cause the WLAN device to duplicate a user-specific field among the plurality of channels excluding the at least one punctured frequency range. The user-specific field may indicate the plurality of RUs allocated to the first station.

Another innovative aspect of the subject matter described in this disclosure can be implemented as a WLAN apparatus that includes a WLAN interface for transmitting signals via a wireless channel and a processor configured to control the WLAN interface. The processor may be further configured to determine available RUs within the wireless channel, where the wireless channel includes at least one punctured frequency range. The processor may be further configured to allocate a plurality of RUs to a first station such that the plurality of RUs are punctured to exclude the at least one punctured frequency range. The processor may be further configured to prepare a PPDU for transmission via the at least one antenna. The PPDU may have data for the first station at the plurality of RUs allocated to the first station.

In some implementations, the WLAN interface configured to allocate the plurality of RUs to the first station may include the WLAN interface configured to allocate a first RU and a second RU that are not contiguous with each other.

In some implementations, the WLAN interface may be further configured to prepare a signaling header for the PPDU. The signaling header may indicate the plurality of RUs that are allocated to the first station.

In some implementations, the WLAN interface configured to prepare the signaling header may include the WLAN interface being configured to redefining a meaning of at least one existing signaling header to support allocation of punctured RUs to the first station.

In some implementations, the WLAN interface configured to prepare the signaling header may include the WLAN interface being configured duplicating a user-specific field among the plurality of channels excluding the at least one punctured frequency range. The user-specific field may indicate the plurality of RUs allocated to the first station.

Another innovative aspect of the subject matter described in this disclosure can be implemented as system. The system may include means for determining available RUs within a wireless channel, where the wireless channel includes at least one punctured frequency range. The system may include means for allocating a plurality of RUs to a first station such that the plurality of RUs are punctured to exclude the at least one punctured frequency range. The system may include means for preparing a PPDU for transmission via the wireless channel, the PPDU having data for the first station at the plurality of RUs allocated to the first station.

In some implementations, the means for allocating the plurality of RUs to the first station may include means for allocating a first RU and a second RU that are not contiguous with each other.

In some implementations, the system may include means for preparing a signaling header for the PPDU. The signaling header may indicate the plurality of RUs that are allocated to the first station.

In some implementations, the means for preparing the signaling header may include means for redefining a meaning of at least one existing signaling header to support allocation of punctured RUs to the first station.

In some implementations, the means for preparing the signaling header may include means for duplicating a user-specific field among the plurality of channels excluding the at least one punctured frequency range. The user-specific field may indicate the plurality of RUs allocated to the first station.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
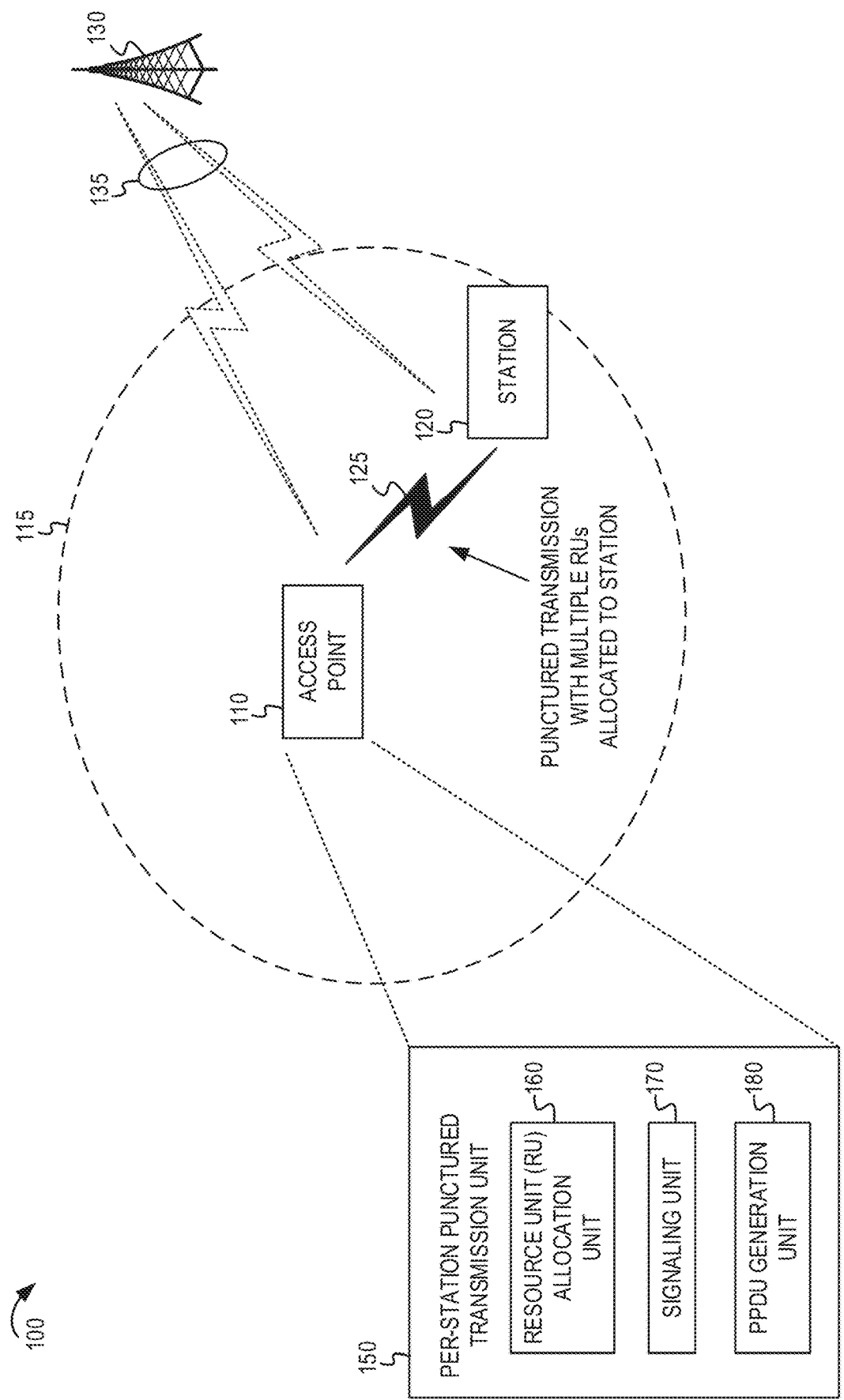
FIG. 1 depicts a system diagram of an example network implementing per-station punctured transmission.

The following description is directed to certain implementations for the purposes of describing the innovative aspects of this disclosure. However, a person having ordinary skill in the art will readily recognize that the teachings herein can be applied in a multitude of different ways. Some examples in this disclosure may be based on wireless local area network (WLAN) communication according to the Institute of Electrical and Electronics Engineers (IEEE) 802.11 wireless standards. However, the described implementations may be implemented in any device, system or network that is capable of transmitting and receiving RF signals according to any communication standard, such as any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G, 5G, 6G, or further implementations thereof, technology.

WLAN technical standards have been created to make use of available bandwidth (in terms of frequencies) in a frequency band. In some systems, a channel map may define how the frequency band may be divided. For example, a map may include a list of operating channels, in which each channel is a 20 MHz (or 40 MHz) width increment. As WLAN technology has developed, it is possible for WLAN devices to combine channels to form a larger wireless channel for higher bandwidth transmissions. For brevity, this disclosure includes descriptions of IEEE 802.11ax devices as an example. However, the techniques in this disclosure may be used with any wireless technology which can utilize combined channels and puncturing. IEEE 802.11ax or later generation IEEE devices can transmit higher throughput by modulating data over a wireless channel consisting of multiple 20 MHz subchannels. For example, IEEE 802.11n described the use of 2 subchannels (for a combined 40 MHz bandwidth) and defined a High Throughput (HT) transmission format. IEEE 802.11ac described the use of 8 subchannels (for a combined 160 MHz bandwidth) and defined a Very High Throughput (VHT) transmission format. IEEE 802.11ax also supports a combined 160 MHz bandwidth (which is a combination of 8 subchannels of 20 MHz width each). In IEEE 802.11ax, a transmission format may spread High Efficiency (HE) modulated symbols throughout the combined channel group. Later generations of IEEE 802.11 may increase the quantity of channels and techniques for modulating data via a group of channels.

IEEE is preparing new bandwidth options for IEEE 802.11be which may define an Extremely High Throughput (EHT) transmission format that supports up to 320 MHz bandwidth (as a combination of multiple subchannels. In some implementations, the total channel bandwidth may include a combination of subchannels (potentially having different sizes) in one or more frequency bands (such as the 5 GHz or 6 GHz frequency bands). The subchannels, which may be contiguous or non-contiguous in the frequency band, may be collectively referred to as a wireless channel (which also may be referred to as a combined channel, channel group, or wide bandwidth channel). Each of the channels that are part of a wide bandwidth channel may be referred to as subchannels or operating channels. For brevity, the examples in this disclosure describe IEEE 802.11ax using a 80 MHz transmission size by combining four (4) subchannels that are 20 MHz each, however, a person having ordinary skill in the art will readily recognize that the examples may be applied to IEEE 802.11be as well.

The WLAN may use orthogonal frequency division multiple access (OFDMA) such that the subcarriers that are in the 80 MHz frequency range can be used concurrently. Furthermore, portions of the 80 MHz frequency range may be allocated to different stations in the WLAN on a per-transmission basis. When resources are allocated to a station, that station may use the resources to detect for downlink transmissions or to send uplink transmissions. The examples in this disclosure are based on downlink transmission (such as from an access point (AP) to a station (STA)). A resource unit (RU) refers to a group of subcarriers (also called "tones") which are contiguous subcarriers in an OFDM symbol and grouped together. Resource units are further described in FIG. 3.

When an incumbent signal occupies a portion of the frequency range associated with the wireless channel, it is desirable to avoid using that portion. Puncturing may be used to avoid a portion of the frequency range. For example, out of a 80 MHz frequency range used for an OFDMA transmission, the WLAN devices may puncture (avoid) using a 20 MHz portion in the frequency range. The punctured portion of the frequency range may result in limited RU sizes in the OFDM symbol. Thus, it is desirable to combine different RU sizes to support efficient allocation of bandwidth for each station.

In accordance with this disclosure, a WLAN device may allocate the remaining portions of the frequency range to one or more stations. For example, a WLAN device may allocate multiple RUs per-station. In some implementations, the multiple RUs may be non-contiguous portions of an OFDM symbol that are allocated to a same station. The non-contiguous portions can be allocated to avoid punctured portions of the frequency range. The RU allocations to a station may be referred to as per-station punctured transmission when the RUs are non-contiguous.

A physical convergence layer (PHY) protocol data unit (PPDU) may include traffic for a station using a plurality of RUs. A PPDU also may be referred to as a packet or a frame in this disclosure. In one aspect of this disclosure, a PPDU may include signaling header to indicate the sizes of RUs and which RUs are allocated to each station. The signaling header may be capable of indicating multiple RUs for a same station. In some implementations, the PPDU may be based on a multi-user (MU) multiple-input-multiple-output (MU-MIMO) packet format defined in IEEE 802.11ax draft standard. The MU-MIMO packet format may be modified to support multiple RU allocations to a same station. The PPDU may support single user (SU) transmissions with multiple RUs allocated to the single station by using a variant of the MU-MIMO packet format. In some implementations, the MU-MIMO packet format may be modified, extended, or redefined to support per-station punctured transmission by permitting multiple RU allocations to a station. The signaling headers of the MU-MIMO packet format may be changed to indicate support for the per-station punctured transmission while maintaining backward compatibility for stations that do not support per-station punctured transmissions.

Particular implementations of the subject matter described in this disclosure can be implemented to realize one or more of the following potential advantages. By using combinations of RUs allocated to a station in a punctured transmission, a WLAN system can make more efficient use of the frequency range associated with a wireless channel. For example, in an 80 MHz wide channel with a 20 MHz punctured frequency range, multiple RUs can be allocated to a station so that the remaining 60 MHz of available frequency range can be allocated. As IEEE develops larger channel sizes (including 160 MHz, 240 MHz, and 320 MHz wide channels), the techniques of this disclosure may be useful in allocating different combinations of RUs (and thus, different amounts of bandwidth) to a station. This would result in a greater amount of bandwidth for the station than would otherwise have been allocated by a single RU (of a smaller size). The signaling techniques described in this disclosure provide flexibility for allocation of different amounts of bandwidth by combining multiple RUs.

FIG. 1 depicts a system diagram of an example network implementing per-station punctured transmission. The system diagram 100 includes an access point (AP) 110 and a station (STA) 120. The AP 110 and STA 120 may form a WLAN. While the description that follows describes features of the AP 110 using per-station punctured transmissions for a downlink transmission to the STA 120, the techniques described in this disclosure may be used for uplink transmissions or by other types of WLAN devices. In some implementations, a WLAN in a home, apartment, business, or another area may include multiple APs (not shown). The WLAN also may be communicatively coupled to a broadband network (not shown) and may enable STAs wirelessly coupled to an AP to access the broadband network. For example, a gateway device (such as a central AP or router) can couple to the broadband network through a cable, a fiber optic, a power line, or DSL network connection. In other deployments, there may be multiple APs within an environment which are related to different WLANs. The multiple APs may each operate on one or more operating channels within an unlicensed frequency band. A channel may refer to a portion of the unlicensed frequency band. Each channel may have a pre-defined central frequency and channel width (such as 20 MHz channel width). Some APs are capable of determining which operating channels are least congested and establish itself on selected operating channels. The AP 110 may provide a coverage range 115 for STAs within that coverage range 115 to communicate with the AP 110.

The system diagram 100 also shows an incumbent system which may be transmitting an incumbent signal in part of the frequency band. In the system diagram 100, a base station 130 (such as an eNodeB or Home eNodeB using LTE) may be transmitting incumbent wireless signals 135. So that the AP 110 and STA 120 do not interfere with the incumbent wireless signals 135. The AP 110 may be configured so that it does not use frequencies that overlap with the incumbent wireless signals 135. In one example, the AP 110 may puncture a 20 MHz portion of an 80 MHz frequency range. The AP 110 may use the remaining 60 MHz to communicate with stations in the coverage range 115.

The AP 110 may include a per-station punctured transmission unit 150 capable of implementing the techniques in this disclosure. The per-station punctured transmission unit 150 may include an RU allocation unit 160, a signaling unit 170, and a PPDU generation unit 180. The RU allocation unit 160 may be configured to allocate more than one RU in a punctured transmission 125 to the STA 120. For example, the RU allocation unit 160 may allocate a first RU having a 40 MHz size and a second RU having a 20 MHz size (using the full 60 MHz remaining in the frequency range excluding the 20 MHz punctured portion). The 40 MHz RU and the 20 MHz RU may not be contiguous frequencies (tones) in the OFDM symbol. The signaling unit 170 may create signaling headers for the punctured transmission 125. The signaling headers may define which RUs are allocated to the STA 120. The PPDU generation unit 180 includes the signaling headers in a wireless transmission to the STA 120. In some implementations, the wireless transmission is based on a MU-MIMO packet format in IEEE 802.11ax with modifications to support the punctured transmission.

Figure 2:
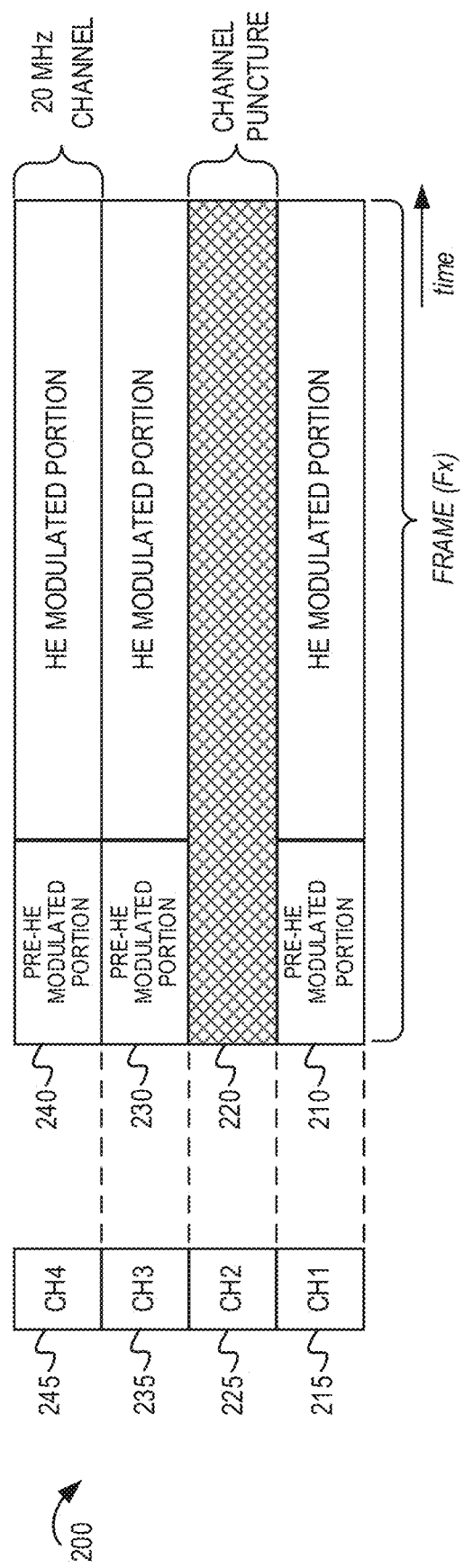
FIG. 2 depicts an example punctured transmission.

FIG. 2 depicts an example punctured transmission. The example punctured transmission 200 may utilize multiple channels which collectively form a wide bandwidth channel. In the example of FIG. 2, an 80 MHz transmission may utilize a group of four 20 MHz channels (a first channel 215, a second channel 225, a third channel 235, and a fourth channel 245). Larger groups of channels may be used in some implementations. For example, IEEE 802.11ax provides for the use of 8 channels, and later versions of IEEE 802.11 may provide for the use of 16 (or more) channels for higher bandwidth transmissions. The AP 110 may not be able to use the full 80 MHz bandwidth because of an incumbent signal in at least part of the second channel 225. To avoid transmitting in the same frequency range as the incumbent signal, the AP 110 may utilize channel puncturing (as shown in block 220). In full channel puncturing, the WLAN device would refrain from transmitting in the punctured frequency range (such as the second channel 225). Instead, the WLAN device would modulate a wireless transmission using the unpunctured frequencies (signals 210, 230, and 240, being transmitted via the first channel 215, the third channel 235 and the fourth channel 245, respectively). The wireless transmission may include a pre-HE modulated portion on each of the non-punctured frequencies. The pre-HE modulated portion is used to prepare a recipient of the HE modulated portion to properly detect and decode the modulation of the HE modulated portion. The pre-HE modulated portion may include header fields (such as preamble, training signals, or other signaling headers). Upon receiving the pre-HE modulated portion, the receiver will be configured to collect and demodulate the HE modulated portion that is spread over the channels and which follows the pre-HE modulated portions on those channels.

Figure 4B:
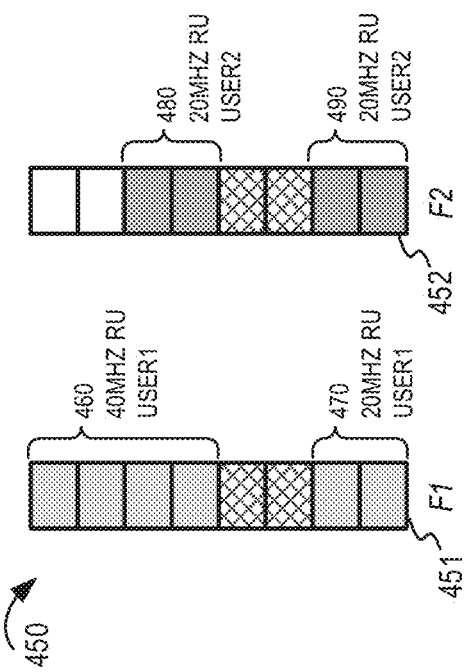
FIG. 4B depicts an example series of wireless frames using per-station puncturing.
Figure 4A:
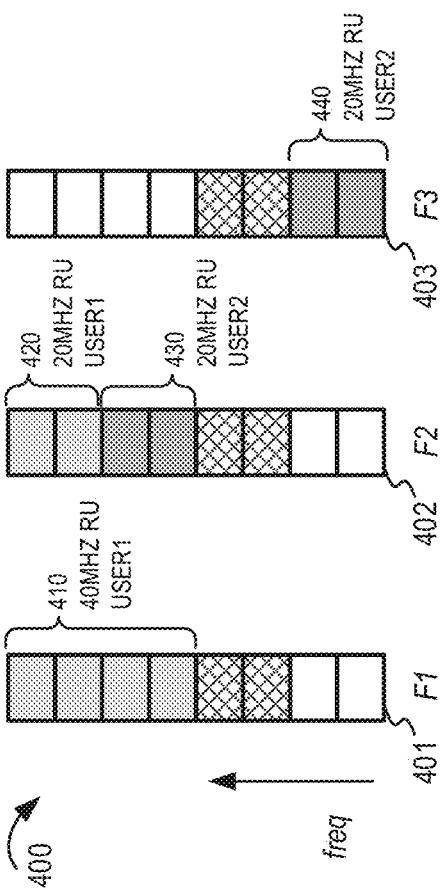
FIG. 4A depicts an example series of wireless frames in which per-station puncturing is not used.

Together, the wireless transmission (including signals 210, 230, 240) may be referred to as a wireless frame (or packet, PPDU, or the like). The HE modulated portion of the transmission is not duplicated but rather consists of data that is modulated across all the frequencies in the non-punctured frequencies. The HE modulated portion may be divided into RUs using the available frequency range. FIGS. 4A and 4B show how the RUs may be allocated among multiple stations (referred to as "user1" and "user2"). The IEEE 802.11 standard specification (and amendments thereof) describes different possible RU sizes. For example, a 26-tone RU is equivalent to a 2 MHz portion of the OFDM symbol. The following RU sizes are currently defined 26-tones (2 MHz), 52-tones (4 MHz), 106-tones (10 MHz), 242-tones (20 MHz), 484-tones (40 MHz), 996-tones (80 MHz), and 2*996-tones (160 MHz). It may be possible to create new combinations of RU sizes by combining the currently defined RU sizes. For example, new RU sizes could use 726-tones (60 MHz), 1238-tones (100 MHz), 1452-tones (120 MHz), and 1722-tones (140 MHz). Other RU sizes may be possible by combining the above-mentioned RU sizes. The punctured frequency range can be any size associated with the above mentioned RUs (or combination of RUs). For example, in FIG. 2, the punctured frequency range is associated with a 20 MHz channel (equivalent to a 242-tone size RU).

Figure 3:
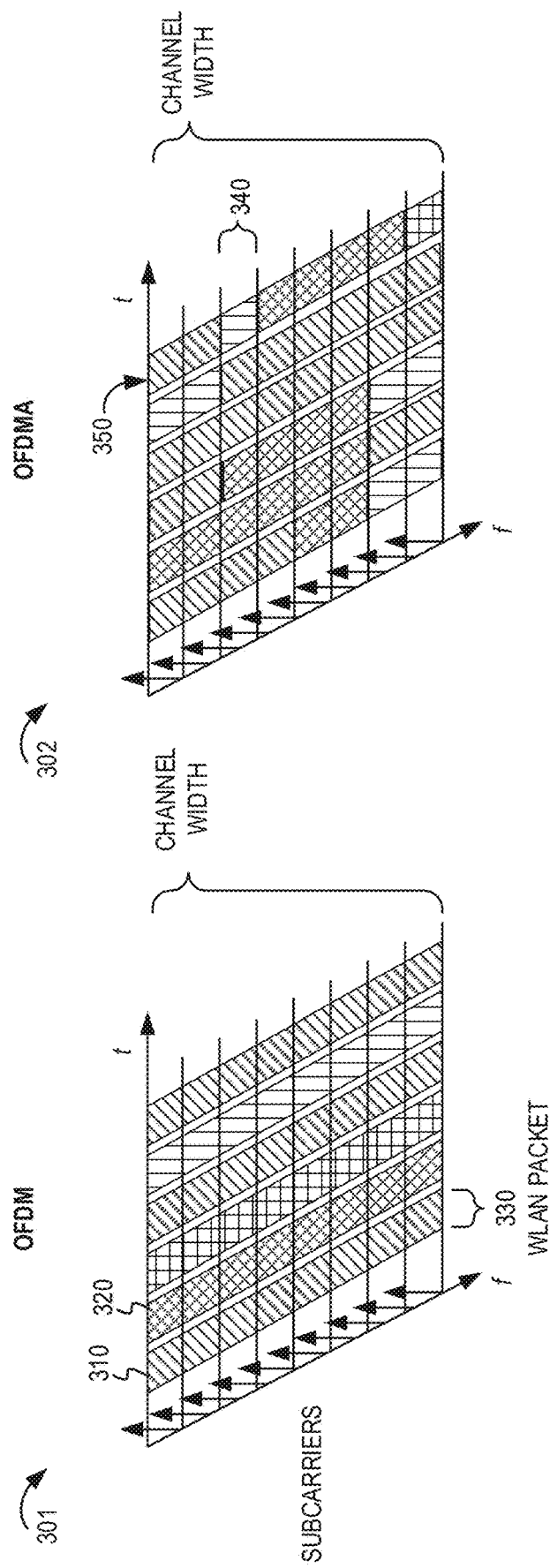
FIG. 3 shows example conceptual diagrams of orthogonal frequency-division multiplexing (OFDM) and orthogonal frequency-division multiple access (OFDMA) to illustrate resource assignments of a wireless channel.

FIG. 3 shows example conceptual diagrams of OFDM and OFDMA to illustrate resource assignments of a wireless channel. The left side of FIG. 3 shows a conceptual diagram of OFDM 301. The OFDM channel width may include multiple subcarriers. A WLAN packet 330 (also referred to as a PPDU) includes data that is encoded using the subcarriers of the channel width. For example, a first STA may transmit a first PPDU 310 at a first time period. During a second time period, a second STA may transmit a second PPDU 320. The PPDUs 310 and 320 may be different lengths of time. Typically, the first STA and the second STA (and any other STAs in the BSS) will contend for access to the channel. Once the STA wins the contention, the STA can use the channel for transmission of a PPDU. As shown in the conceptual diagram of OFDM 301, different shading of the PPDUs indicates that different STAs may utilize the wireless channels sequentially, one at a time. However, this communication structure may be inefficient if a WLAN device does not have enough data to justify using the full channel width. The IEEE 802.11ax standard introduced the use of ODFMA in a WLAN.

The right side of FIG. 3 shows a conceptual diagram of OFDMA 302. ODFMA breaks down the full channel width into a plurality of resource units (RUs). Each RU may include a different quantity of subcarriers. Using OFDMA, a first WLAN device (such as an AP) may allocate different RUs for different STAs. For example, a PPDU 350 may include different RUs allocated for a first STA, a second STA, a third STA, and a fourth STA. One RU 340 is allocated for a STA to transmit uplink data in the PPDU 350, while other RUs are allocated for different STAs. The allocation of RUs may be used for downlink transmissions or to schedule channel access.

While the concept of RUs provides an efficient way to allocate resources within the wireless channel, the communication format may be improved to accommodate puncturing. For example, absent the techniques of this disclosure, the punctured frequencies may limit the amount of bandwidth allocated (by an RU) to a station. Traditional allocation techniques do not support per-station puncturing and thus an RU allocation to a station may be smaller than necessary due to punctured frequencies in the wireless channel.

FIG. 4A depicts an example series of wireless frames in which per-station puncturing is not used. In FIG. 4A, only 1 RU may be allocated per user and puncturing is not supported, according to a legacy technique. For brevity, only the HE modulated portions of the series of wireless frames 400 are depicted. A first frame 401 (F1) includes a first RU 410 allocated to user1. For example, the first RU 410 may be used for downstream traffic from an AP to a first STA (user1). In FIG. 4A, the first RU 410 is a 40 MHz RU (484 tones, which may be associated with the third channel 235 and the fourth channel 245 described in FIG. 2). Even though, the AP 110 may wish to allocate more bandwidth to user1, the legacy technique does not provide a mechanism to allocate more than one RU per user. Thus, the remaining data may be allocated in the next wireless frame (second frame 402, F2). In the second frame 402, a second RU 420 is allocated to the user1. The second RU 420 is a 20 MHz RU (242 tones) associated with the fourth channel 245. The second frame 402 also allocates a third RU 430 to the user2. A third frame 403 (F3) may include a fourth RU allocation 440 (20 MHz RU) to the user2. Thus, three frames (F1, F2, and F3) were used to communicate all the data for user1 and user2.

FIG. 4B depicts an example series of wireless frames using per-station puncturing. Different from FIG. 4A, the series of wireless frames 450 may utilize per-station puncturing in accordance with this disclosure. To support per-station puncturing, multiple RUs may be allocated to a same user. For example, a first frame 451 (F1) may have two RUs allocated to user1. The two RU allocations (first RU 460 and second RU 470) may be non-contiguous due to the puncturing of the second channel 225. However, the two RU allocations may be combined to support a 60 MHz bandwidth (combined RU) for user1. Similarly, the second frame 452 (F2) may have two RUs (third RU 480 and fourth RU 490) allocated to user2. Although the same amount of bandwidth (as FIG. 4A) is allocated for user1 and user2 in FIG. 4B, only two frames (F1 and F2) were used to communicate all the data for user1 and user2.

The example in FIG. 4B is merely one of many example configures that could be used with this disclosure. For example, the RU allocation technique in this disclosure could be used with a 60 MHz wide channel and RU allocations with two or more users. In another example, an 80 MHz wide channel could support 60 MHz allocated to user1 (using a combination of smaller RU sizes) and 20 MHz allocated to user2. The smaller RU sizes may be combined in non-contiguous portions of the PPDU.

Figure 5:
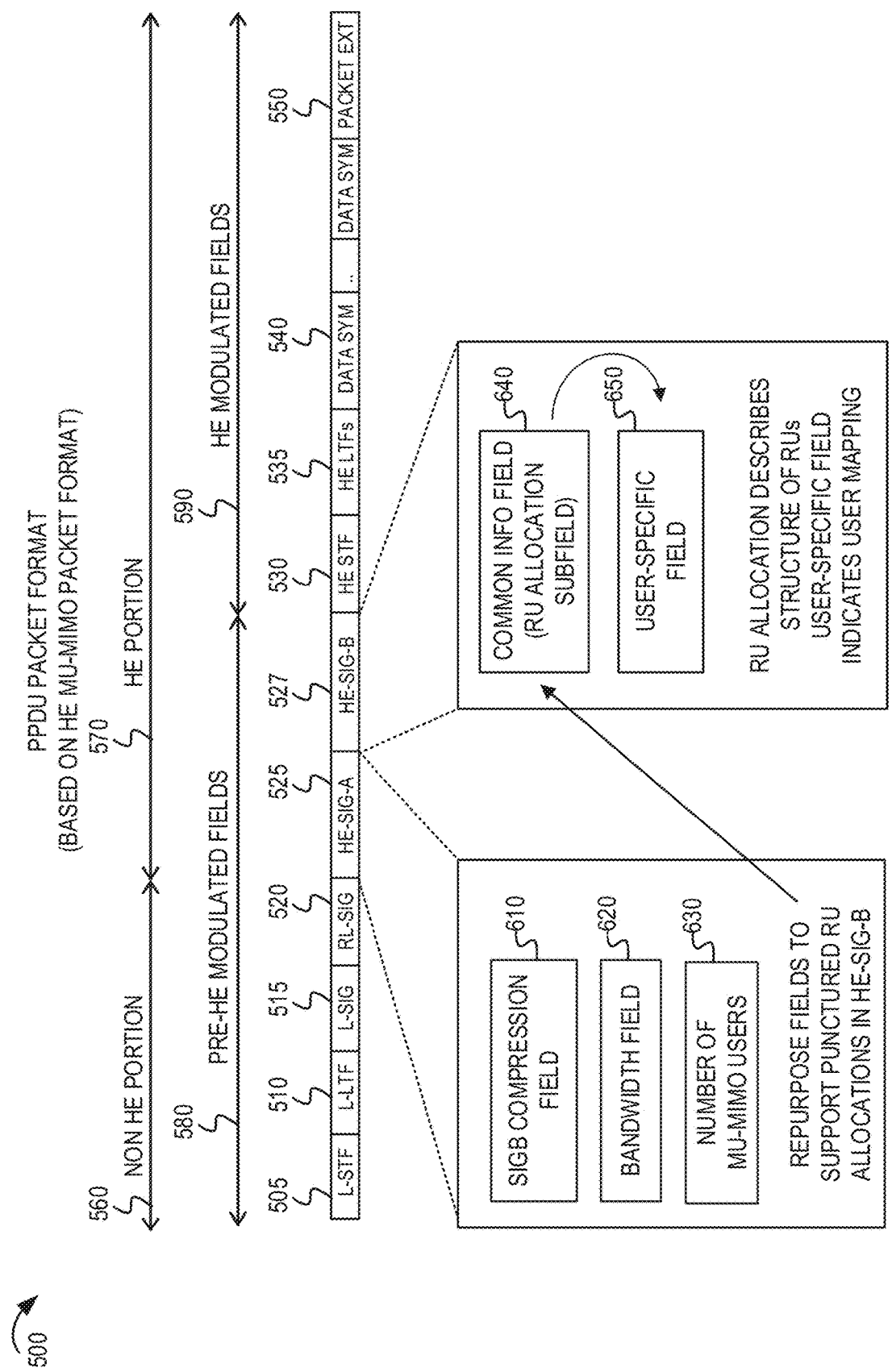
FIG. 5 depicts an example physical layer (PHY) protocol data unit (PPDU) packet format that supports per-station punctured transmissions.

FIG. 5 depicts an example PPDU packet format that supports per-station punctured transmissions. The PPDU 500 is based on a HE MU-MIMO packet format defined in IEEE 802.11ax with some modifications. The PPDU 500 described in this disclosure is one of many formats that may be used to communicate data using per-station puncturing in accordance with this disclosure. A non-HE portion 560 includes a legacy short training field 505 (L-STF), a legacy long training field 510 (L-LTF), and a legacy signal field 515 (L-SIG). The remaining portion of the PPDU is considered an HE modulated portion 570 because it includes features that are relevant to devices capable of HE transmissions. The pre-HE modulated fields 580 include the non-HE portion 560 as well as some fields to bootstrap the HE modulated fields 590. For example, the pre-HE modulated fields 580 may further include a repeated legacy signal field 520 (RL-SIG), a first HE signal field 525 (HE-SIG-A), and a second HE signal field 527 (HE-SIG-B). The repeated legacy signal field 520 and the first HE signal field 525 may be modulated using a more reliable (robust) modulation than has lower throughput than the modulation scheme using for the HE modulated fields 590.

The HE modulated fields 590 includes an HE short training field 530 (HE STF), one or more symbols for an HE long training field 535 (HE LTF), one or more data symbols 540, and may include a packet extension field 550. The HE modulated fields 590 is modulated using inverse fast Fourier transform (IFFT) to convert the signal to orthogonal carrier transmissions in the time domain.

As mentioned previously, a WLAN device may include a signaling header in the PPDU to support the punctured transmissions. Specifically, the signaling header may be modified to enable multiple RU allocations for a single user. In one example, the signaling header may be in the HE-SIG-A and the HE-SIG-B.

For example, the HE-SIG-A may include fields such as the SIGB Compression field 610, a Bandwidth field 620, and a Number of MU-MIMO Users field 630. The Number of MU-MIMO Users field 630 may indicate only 1 users if the PPDU is being used for a single user. Alternatively, the Number of MU-MIMO Users field 630 may indicate how many users are allocated RUs in the PPDU. The SIGB Compression field 610 is normally used to indicate a short format for the HE-SIG-B field. A value of "1" in the SIGB Compression field 610 is traditionally used when no channels are punctured. However, in some implementations of this disclosure, the SIGB Compression field 610 may be redefined or repurposed so that it can support per-station punctured transmissions. Thus, a WLAN device may set SIGB Compression field 610 to "1," so that the PPDU can follow a packet format for MU-MIMO that includes additional information in the HE-SIG-B field. The Bandwidth field 620 may set to a value that indicates which channel(s) are punctured. For example, the WLAN device may:

Set to 4 for preamble puncturing in 80 MHz, where in the preamble only the secondary 20 MHz is punctured. (60 MHz total allocation available)

Set to 5 for preamble puncturing in 80 MHz, where in the preamble only one of the two 20 MHz subchannels in secondary 40 MHz is punctured. (60 MHz total allocation available)

Set to 6 for preamble puncturing in 160 MHz or 80+80 MHz, where in the primary 80 MHz of the preamble only the secondary 20 MHz is punctured. (100/120/140 MHz total allocation available)

Set to 7 for preamble puncturing in 160 MHz or 80+80 MHz, where in the primary 80 MHz of the preamble the primary 40 MHz is present. (100/120/140 MHz total allocation available)

Typically, when the SIGB Compression field 610 indicates "1," that would mean that a common information field is not used in the HE-SIG-B field. However, when a recipient sees that the SIGB Compression field 610 indicates a setting of "1" (which otherwise would indicate no puncturing) and a setting of 4, 5, 6, or 7 in the Bandwidth field 620, the recipient will recognize the PPDU as following the technique in this disclosure. Thus, the HE-SIG-B field will include a Common Information field 640 (in contrast to the previous definition of the SIGB Compression field 610). The HE-SIG-B field may include a common information field 640 and one or more user-specific fields 650. The quantity of User-Specific fields 650 will depend on the value in the Number of MU-MIMO Users field 630 in the HE-SIG-A. The Common Information field 640 includes, among other information, an RU allocation subfield. The RU allocation subfield describes the structure of the RUs in the HE modulated fields 490.

In some implementations, the RU Allocation subfield may indicate new RU sizes using combinations of existing RU Allocation subfield settings. For example, allowed RU Allocation subfield values may include 242-tones, 242-tone RU Empty, 484-tones, 484-tone with RU zero Users field, 996-tone, 996-tone with zero User field (punctured and non-punctured BW indicated). RU of sizes less than 242-tone may be disallowed in this case.

In some implementations, the per-station punctured transmissions may be limited to RUs with sizes equal to or greater than 242-tones. In this scenario, the technical specification may be updated to provide a new RU allocation table that includes values for 242, 242-tone RU Empty, 484, 484-tone with RU zero Users field, 996, and 996-tone with zero User field (punctured and non-punctured BW indicated).

Although the examples in this disclosure are based on the IEEE 802.11ax tone map and RU allocation table, the techniques may be applicable to later amendments or versions of the IEEE 802.11 standard. For example, the IEEE 802.11be draft specification is expected to define a different tone map and RU allocation tables for use with wide bandwidth channels up to 320 MHz. Furthermore, the size of RUs and punctured frequency ranges may change depending on the wireless channel bandwidth. For example, the minimum puncturing size for IEEE 802.11ax is 2 MHz. For a wide bandwidth channel (such as 320 MHz), it is possible that the puncturing size would be larger (such as 20 MHz puncturing). An RU allocation table may define different sizes of RUs that can be allocated to a station in various combinations.

Figure 6:
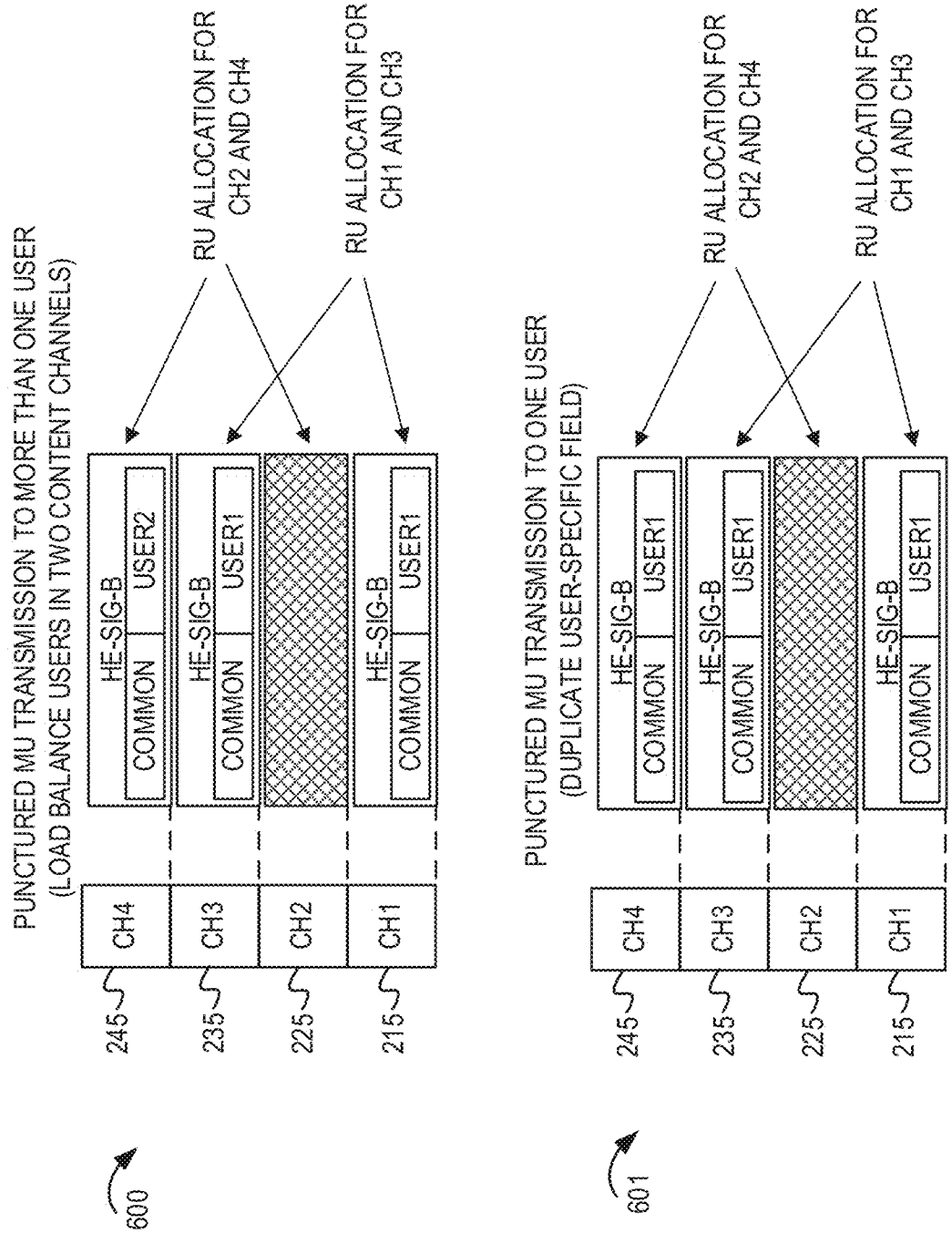
FIG. 6 depicts example techniques for signaling resource unit allocations when using per-station punctured transmissions.

FIG. 6 depicts example techniques for signaling resource unit allocations when using per-station punctured transmissions. For brevity, only the HE-SIG-B is shown in FIG. 6 to highlight the signaling associated with the RU allocation field and user-specific field. The HE-SIG-B field is separately encoded on each 20 MHz channel.

In the top portion 600, the PPDU is used for multiple users (user1 and user2). A first version of the HE-SIG-B is repeated on the first channel 215 and the third channel 235. The common information field in the first version of the HE-SIG-B includes the RU allocation subfield describing the RUs in the first channel 215 and the third channel 235. The second version of the HE-SIG-B would normally be repeated on the second channel 225 and the fourth channel 245—but since the second channel 225 is punctured, the second version is only signaled on the fourth channel 245. The second version of the HE-SIG-B includes the RU allocation subfield for the RUs in the fourth channel 245. Because there are multiple users, the user-specific subfield would be load balanced in the two versions of the HE-SIG-B. For example, user1 may be included in the first version (signaled on the first channel 215 and the third channel 235), and user2 may be included in the second version (signaled on the fourth channel 245). If there were more users, they would be load balanced between the first version and the second version.

In the bottom portion 601, the PPDU is used for a single user (such as the STA 120 in FIG. 1). When the PPDU is used for a single user, the user-specific field may be duplicated in both versions of the HE-SIG-B. For example, the first version (in the first channel 215 and the second channel 225) and the second version (in the fourth channel 245) may both include the same user-specific field to indicate the allocations for user1. In some implementations, the user-specific field may only be signaled in one version of the HE-SIG-B field while null or padding is used in the other.

Figure 7:
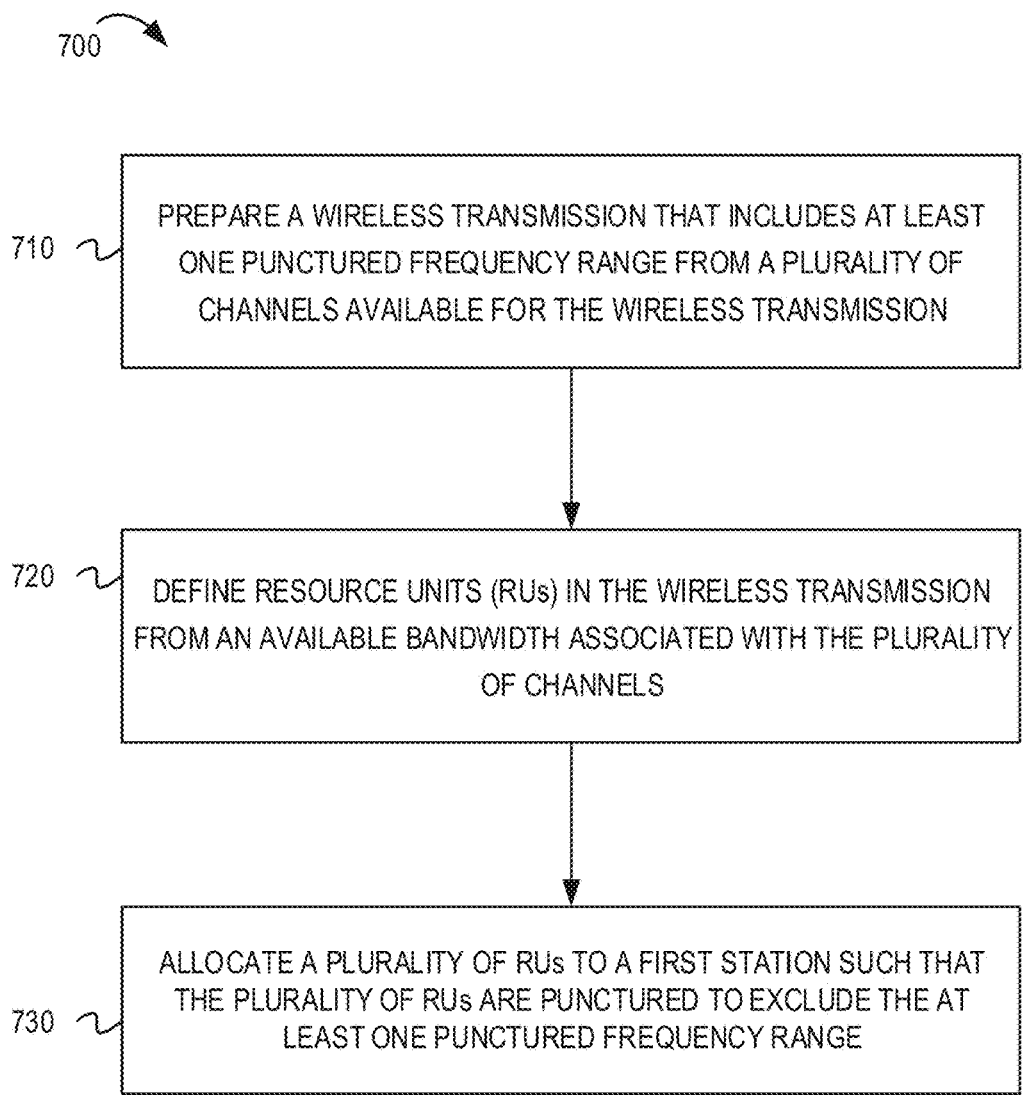
FIG. 7 depicts an example flowchart with example operations to support a per-station punctured transmission.

FIG. 7 depicts an example flowchart with example operations to support a per-station punctured transmission. The example flowchart 700 may be performed by a WLAN device (such as the AP 110 or the STA 120). The flowchart 700 begins at block 710. At block 710, the WLAN device may prepare a wireless transmission that includes at least one frequency range from a plurality of channels available for the wireless transmission. At block 720, the WLAN device may define RUs in the wireless transmission from an available bandwidth associated with the plurality of channels. At block 730, the WLAN device may allocate a plurality of RUs to a first station such that the plurality of RUs are punctured to exclude the at least one punctured frequency range. In some implementations, the WLAN device may transmit the wireless transmission to at least the first station. A header of the wireless transmission may indicate the plurality of RUs allocated to the first station such that the first station can receive a transmission from the WLAN device by decoding the signals at the plurality of RUs.

Figure 8:
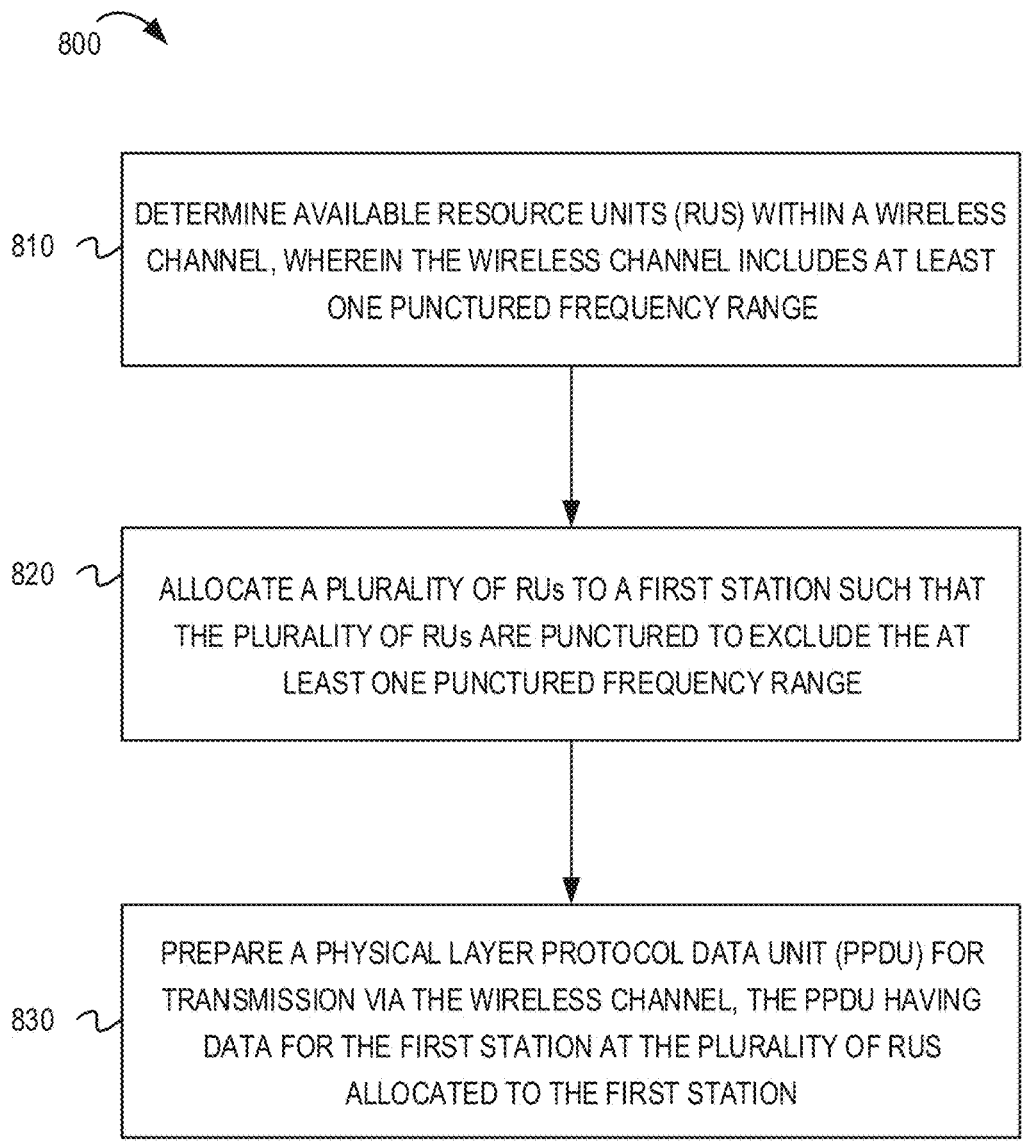
FIG. 8 depicts another example flowchart with example operations to prepare a PPDU with a plurality for RUs allocated for a station.

FIG. 8 depicts another example flowchart with example operations to prepare a PPDU with a plurality for RUs allocated for a station. The example flowchart 800 may be performed by a WLAN device (such as the AP 110 or the STA 120). The flowchart 800 begins at block 810. At block 810, the WLAN device may determine available resource units (RUs) within a wireless channel, where the wireless channel includes at least one punctured frequency range. For example, the wireless channel may be made up of several subchannels or a channel group to form a wide bandwidth channel. In some implementations, the wireless channel may have a large bandwidth (such as 160 MHz, 240 MHz, or 320 MHz). The punctured frequency range may be within the boundaries of the wireless channel. Reasons for having a punctured frequency range may include an incumbent signal, interference, or the like.

At block 820, the WLAN device may allocate a plurality of RUs to a first station such that the plurality of RUs are punctured to exclude the at least one punctured frequency range. For example, the plurality of RUs may include subcarriers that are not in the punctured frequency range. In some implementations, the plurality of RUs may be non-contiguous such that the punctured frequency range is between the frequencies associated with a first RU and a second RU.

At block 830, the WLAN device may prepare a physical layer protocol data unit (PPDU) for transmission via the wireless channel. The PPDU may have data for the first station at the plurality of RUs allocated to the first station. A header of the PPDU may indicate which RUs (including the plurality of RUs) are allocated to which stations. For example, the header may inform the first station about the allocated plurality of RUs so that the first station can observe the signals at those RUs which include the data directed to the first station.

Figure 9:
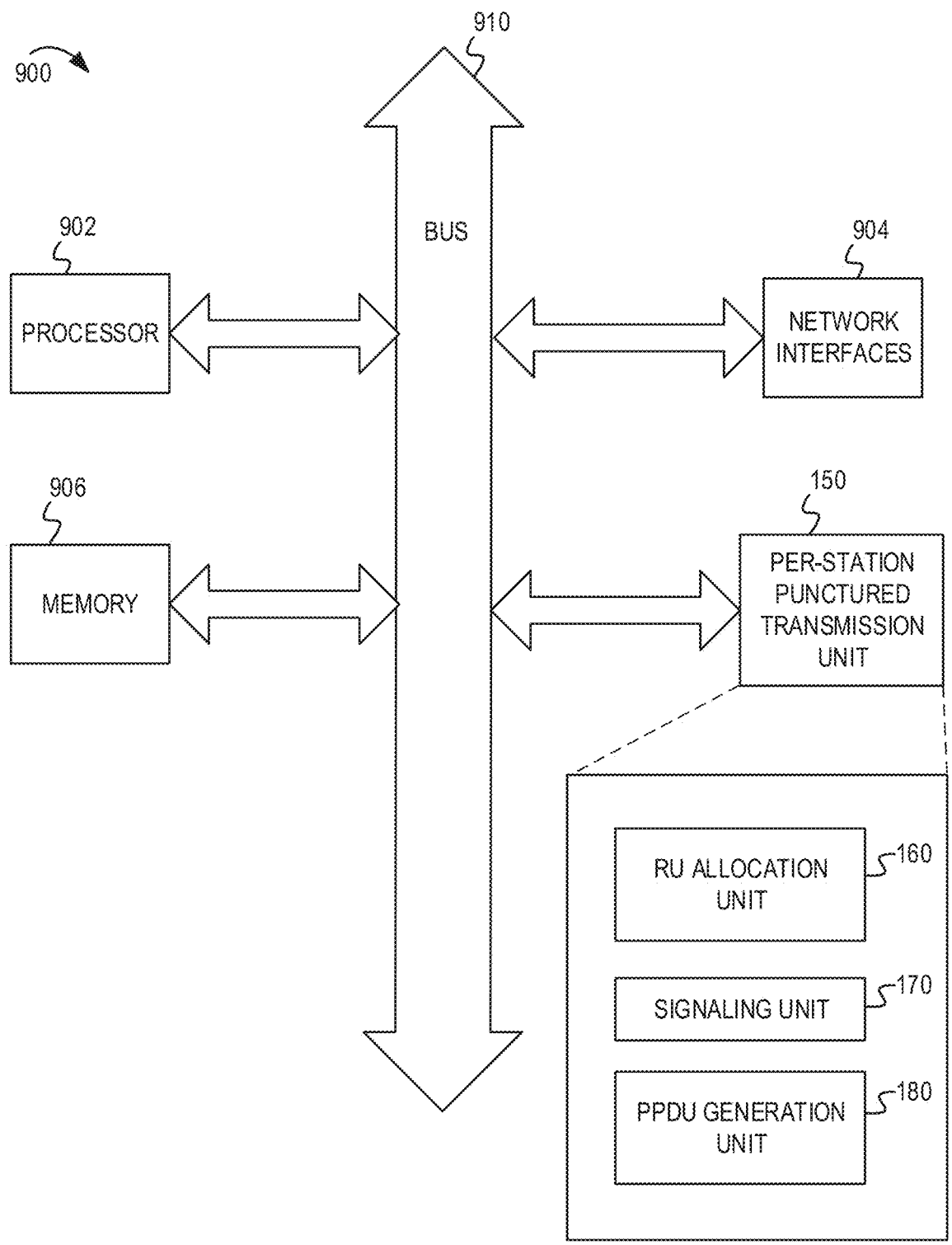
FIG. 9 shows a block diagram of an example electronic device for implementing aspects of this disclosure.

FIG. 9 shows a block diagram of an example electronic device for implementing aspects of this disclosure. In some implementations, the electronic device 900 may be a WLAN device (including any of the WLAN devices described herein, such as the AP 110 and the STA 120). The electronic device 900 can include a processor unit 902 (possibly including multiple processors, multiple cores, multiple nodes, or implementing multi-threading, etc.). The electronic device 900 also can include a memory unit 906. The memory unit 906 may be system memory or any one or more of the possible realizations of computer-readable media described herein. The electronic device 900 also can include a bus 910 (such as PCI, ISA, PCI-Express, HyperTransport®, InfiniBand®, NuBus,® AHB, AXI, etc.), and a network interface 904 that can include at least one of a wireless network interface (such as a WLAN interface, a Bluetooth® interface, a WiMAX® interface, a ZigBee® interface, a Wireless USB interface, etc.) and a wired network interface (such as an Ethernet interface, a powerline communication interface, etc.). In some implementations, the electronic device 900 may support multiple network interfaces—each of which is configured to couple the electronic device 900 to a different communication network.

The electronic device 900 may include a per-station punctured transmission unit 150 capable of implementing the techniques in this disclosure. The per-station punctured transmission unit 150 may include an RU allocation unit 160, a signaling unit 170, and a PPDU generation unit 180. In some implementations, the per-station punctured transmission unit 150 can be distributed within the processor unit 902, the memory unit 906, and the bus 910. The memory unit 906 can include computer instructions executable by the processor unit 902 to implement the functionality of the implementations described in FIGS. 1-8. Any of these functionalities may be partially (or entirely) implemented in hardware or on the processor unit 902. For example, the functionality may be implemented with an application specific integrated circuit, in logic implemented in the processor unit 902, in a co-processor on a peripheral device or card, etc. Further, realizations may include fewer or additional components not illustrated in FIG. 9 (such as video cards, audio cards, additional network interfaces, peripheral devices, etc.). The processor unit 902, the memory unit 906, and the network interface 904 are coupled to the bus 910. Although illustrated as being coupled to the bus 910, the memory unit 906 may be coupled to the processor unit 902.

In some implementations, a transmitter component of the network interface 904 may be modified to support the techniques in this disclosure. For example, a baseband component (which may be referred to as "RU Parser") may be added after a segment parser. The RU Parser may distribute the bits among the disjoint (potentially non-contiguous) RUs. In some implementations, a tone mapper may be modified to support mapping of data for multiple RUs to the different frequencies in the OFDMA transmission.

Although the examples in this disclosure relate to a downlink transmission from an AP to a STA, the techniques also can be used for an uplink transmission. For example, the AP may allocate RUs for the uplink MU-MIMO transmission and the STA can utilize the allocated RUs for uplink signals. Furthermore, implementations of this disclosure may be included in a STA such that the STA is configured to decode the signaling headers to determine that multiple RUs are allocated to the STA for uplink or downlink transmissions.

FIGS. 1-9 and the operations described herein are examples meant to aid in understanding example implementations and should not be used to limit the potential implementations or limit the scope of the claims. Some implementations may perform additional operations, fewer operations, operations in parallel or in a different order, and some operations differently. While the aspects of the disclosure have been described in terms of various examples with their associated operations, other operations or combination of operations from any number of different examples is also within the scope of the aspects of the disclosure.

For example, another example implementation of the subject matter described in this disclosure can be implemented by a WLAN device. The WLAN device may prepare a wireless physical layer (PHY) protocol data unit (PPDU) for transmission via a plurality of channels, where the PPDU is based, at least in part, on a multi-user (MU) multiple-input-multiple-output (MIMO) packet format defined for wireless local area network communication, the MU-MIMO packet format including a first high efficiency (HE) signaling field (HE-SIG-A) and a second HE signaling field (HE-SIG-B). The WLAN device may determine to puncture at least one punctured frequency range from the plurality of channels. The WLAN device may define a resource units (RUs) in the PPDU from an available bandwidth associated with the plurality of channels. The WLAN device may allocate a plurality of RUs to a first station such that the plurality of RUs are punctured to exclude the at least one punctured frequency range. The WLAN device may set a signaling compression field (SIGB Compression) subfield in the HE-SIG-A field to a first value and setting a bandwidth subfield in the HE-SIG-A field to indicate the available bandwidth excluding the at least one punctured frequency range. The WLAN device may include a common information subfield in the HE-SIG-B field to indicate an RU allocation that defines how the plurality of RUs are structured in the PPDU, and include a user-specific subfield in the HE-SIG-B field to indicate which RUs are allocated to the first station. In some implementations, the WLAN device may transmit the PPDU to at least the first station.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends on the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray™ disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine-readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or delta of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for wireless communication, comprising:
   determining available resource units (RUs) within a wireless channel, wherein the wireless channel includes at least one punctured frequency range;
   allocating a plurality of RUs within a physical layer protocol data unit (PPDU) to include data for a first station, wherein the plurality of RUs include at least a first RU and a second RU that are allocated for the same first station, and wherein the plurality of RUs exclude the at least one punctured frequency range of the wireless channel;
   preparing the PPDU for transmission via the wireless channel, the PPDU having the data for the first station at the plurality of RUs allocated to the first station; and
   wherein the transmission includes a pre-HE modulated portion on each of the non-punctured frequency ranges of the wireless channel.

2. The method of claim 1, further comprising:
   transmitting the PPDU to at least the first station.

3. The method of claim 1, wherein the PPDU includes a multi-user (MU) multiple-input-multiple-output (MIMO) transmission.

4. The method of claim 1, wherein the PPDU includes an orthogonal frequency divisional multiple access (OFDMA) transmission.

5. The method of claim 1, wherein the first RU and the second RU are not contiguous with each other.

6. The method of claim 1, further comprising:
preparing a signaling header for the PPDU, wherein the signaling header indicates the plurality of RUs that are allocated to the first station.

7. The method of claim 6, wherein preparing the signaling header includes:
redefining a meaning of at least one existing signaling header to support allocation of multiple RUs to the first station.

8. The method of claim 6, wherein preparing the signaling header includes:
duplicating a user-specific field among the plurality of channels excluding the at least one punctured frequency range, wherein the user-specific field indicates the plurality of RUs allocated to the first station.

9. The method of claim 1, wherein the PPDU is a downlink transmission from an access point to the first station.

10. The method of claim 1, further comprising:
allocating a second plurality of RUs in the PPDU to a second station; and
including data for the second station at the second plurality of RUs within the PPDU.

11. A non-transitory computer-readable medium having stored therein instructions which, when executed by a processor of a wireless local area network (WLAN) device, causes the WLAN device to:
determine available resource units (RUs) within a wireless channel, wherein the wireless channel includes at least one punctured frequency range;
allocate a plurality of RUs within a physical layer protocol data unit (PPDU) to include data for a first station, wherein the plurality of RUs include at least a first RU and a second RU that are allocated for the same first station, and wherein the plurality of RUs exclude the at least one punctured frequency range of the wireless channel;
prepare the physical layer protocol data unit (PPDU) for transmission via the wireless channel, the PPDU having data for the first station at the plurality of RUs allocated to the first station; and
wherein the transmission includes a pre-HE modulated portion on each of the non-punctured frequency ranges of the wireless channel.

12. The non-transitory computer-readable medium of claim 11, wherein the instructions to allocate the plurality of RUs include instructions which, when executed by the processor, cause the WLAN device to allocate the first RU and the second RU that are not contiguous with each other.

13. The non-transitory computer-readable medium of claim 11, wherein the instructions, when executed by the processor, cause the WLAN device to prepare a signaling header for the PPDU, wherein the signaling header indicates the plurality of RUs that are allocated to the first station.

14. The non-transitory computer-readable medium of claim 13, wherein the instructions to prepare the signaling header include instructions which, when executed by the processor, cause the WLAN device to redefine a meaning of at least one existing signaling header to support allocation of multiple RUs to the first station.

15. The non-transitory computer-readable medium of claim 13, wherein the instructions to prepare the signaling header include instructions which, when executed by the processor, cause the WLAN device to duplicate a user-specific field among the plurality of channels excluding the at least one punctured frequency range, wherein the user-specific field indicates the plurality of RUs allocated to the first station.

16. A wireless local area network (WLAN) apparatus, comprising:
a processor configured to:
determine available resource units (RUs) within a wireless channel, wherein the wireless channel includes at least one punctured frequency range;
allocate a plurality of RUs within a physical layer protocol data unit (PPDU) to include data for a first station, wherein the plurality of RUs include at least a first RU and a second RU that are allocated for the same first station, and wherein the plurality of RUs exclude the at least one punctured frequency range of the wireless channel;
prepare the PPDU for transmission via the at least one antenna, the PPDU having the data for the first station at the plurality of RUs allocated to the first station wherein the transmission includes a pre-HE modulated portion on each of the non-punctured frequency ranges of the wireless channel; and
an interface configured to output the PPDU for transmission via the wireless channel.

17. The WLAN apparatus of claim 16, wherein the WLAN interface configured to allocate the plurality of RUs to the first station includes the WLAN interface configured to allocate the first RU and the second RU that are not contiguous with each other.

18. The WLAN apparatus of claim 16, wherein the WLAN interface is further configured to prepare a signaling header for the PPDU, wherein the signaling header indicates the plurality of RUs that are allocated to the first station.

19. The WLAN apparatus of claim 18, wherein the WLAN interface configured to prepare the signaling header includes the WLAN interface being configured to redefining a meaning of at least one existing signaling header to support allocation of multiple RUs to the first station.

20. The WLAN apparatus of claim 18, wherein the WLAN interface configured to prepare the signaling header includes the WLAN interface being configured duplicating a user-specific field among the plurality of channels excluding the at least one punctured frequency range, wherein the user-specific field indicates the plurality of RUs allocated to the first station.

21. A system, comprising:
means for determining available resource units (RUs) within a wireless channel, wherein the wireless channel includes at least one punctured frequency range;
means for allocating a plurality of RUs within a physical layer protocol data unit (PPDU) to include data for a first station, wherein the plurality of RUs include at least a first RU and a second RU that are allocated for the same first station, and wherein the plurality of RUs exclude the at least one punctured frequency range of the wireless channel;
means for preparing the PPDU for transmission via the wireless channel, the PPDU having data for the first station at the plurality of RUs allocated to the first station; and
wherein the transmission includes a pre-HE modulated portion on each of the non-punctured frequency ranges of the wireless channel.

22. The system of claim 21, wherein the means for allocating the plurality of RUs to the first station includes means for allocating the first RU and the second RU that are not contiguous with each other.

23. The system of claim 21, further comprising:
- means for preparing a signaling header for the PPDU, wherein the signaling header indicates the plurality of RUs that are allocated to the first station.

24. The system of claim 23, wherein the means for preparing the signaling header includes means for redefining a meaning of at least one existing signaling header to support allocation of multiple RUs to the first station.

25. The system of claim 23, wherein the means for preparing the signaling header includes means for duplicating a user-specific field among the plurality of channels excluding the at least one punctured frequency range, wherein the user-specific field indicates the plurality of RUs allocated to the first station.

\* \* \* \* \*